(12) United States Patent
Hermann (10) Patent No.: US 6,750,421 B2
(45) Date of Patent: Jun. 15, 2004

(54) METHOD AND SYSTEM FOR LASER WELDING

(75) Inventor: Gerald Francis Hermann, Wetsland, MI (US)

(73) Assignee: GSI Lumonics Ltd., Rugby (GB)

( * ) Notice: Subject to any disclaimer, the term of this patent is extended or adjusted under 35 U.S.C. 154(b) by 0 days.

(21) Appl. No.: 10/368,196

(22) Filed: Feb. 18, 2003

(65) Prior Publication Data

US 2003/0173344 A1 Sep. 18, 2003

Related U.S. Application Data

(60) Provisional application No. 60/358,058, filed on Feb. 19, 2002.

(51) Int. Cl.[7] ............................................... B23K 26/20
(52) U.S. Cl. ................................................. 219/121.64
(58) Field of Search ....................... 219/121.6, 121.63, 219/121.64, 121.78, 121.79, 121.81, 121.82, 121.83, 121.85

(56) References Cited

U.S. PATENT DOCUMENTS

| 4,186,172 A | 1/1980 | Scholz |
| 5,428,280 A | 6/1995 | Schmidt et al. |
| 5,532,453 A | 7/1996 | Sheller |
| 5,797,183 A | 8/1998 | Humpolik et al. |
| 6,118,093 A | * 9/2000 | Hong |
| 6,324,758 B1 | 12/2001 | Huang et al. |

FOREIGN PATENT DOCUMENTS

| JP | 09090075 | * 4/1997 |
| WO | WO 00/54925 | 9/2000 |

* cited by examiner

*Primary Examiner*—Samuel M. Heinrich
(74) *Attorney, Agent, or Firm*—John A. Merecki; Hoffman, Warnick & D'Alessandro (57) ABSTRACT

A method and system for laser welding non-circular or non-concentric parts, such as catalytic converter components. The present invention provides a method (and corresponding system for carrying out the method), comprising: providing a part having sections to be welded together; rotating the part on a constant speed rotary; generating a laser beam; directing the laser beam onto a surface of the part to weld the sections of the part together; and controlling the laser beam such that an angle of incidence of the laser beam on the surface of the part remains constant, the laser beam remains in focus on the surface of the part, and the laser beam moves at a constant surface speed along the surface of the part as the part is rotated on the constant speed rotary.

12 Claims, 9 Drawing Sheets

Teaching process of positioning focus head using a robotic manipulator at each of first six positions on the surface at incremental angular positions.

METHOD AND SYSTEM FOR LASER WELDING

This patent application claims the priority of U.S. Provisional patent application serial No. 60/358,058, filed Feb. 19, 2002.

FIELD OF THE INVENTION

The present invention is in the field of laser welding. More particularly, the present invention relates to a method and system for laser welding catalytic converter components or other automotive exhaust components. The present invention is also generally applicable for the laser welding of non-circular or non-concentric parts to produce consistent quality welds.

BACKGROUND OF THE INVENTION

The catalytic converter, an exhaust emissions control device mandated on all cars built in the United States and many other countries, is generally designed in several common configurations. One example of a catalytic converter, referred to as a "stuffed" converter, comprises a cylindrical center shell that is fabricated of metal (e.g., stainless steel). The shell is filled with a layer of specialized insulation surrounding a filter medium of some type, frequently ceramic brick. A metal cap or "cone" is positioned on each end of the shell and is held in place using a welding process. When a conventional welding process, such as metal inert gas (MIG) or tungsten inert gas (TIG) is used to create a fillet or a butt weld, the cones must be machined with very strict height tolerances, and must be positioned with great precision relative to the shell, to ensure proper alignment and fit with the shell. The MIG welding process also tends to generate a substantial amount of heat, which often causes significant material distortion of the cones and/or shell, and consequently, low quality welds. Unfortunately, this results in increased manufacturing and assembly costs, and decreased manufacturing throughput.

SUMMARY OF THE INVENTION

The present invention provides a method and system for laser welding non-circular or non-concentric parts, such as catalytic converter components.

Generally, the present invention provides a method (and corresponding system for carrying out the method), comprising:
  providing a part having sections to be welded together;
  rotating the part on a constant speed rotary;
  generating a laser beam;
  directing the laser beam onto a surface of the part to weld the sections of the part together; and
  controlling the laser beam such that an angle of incidence of the laser beam on the surface of the part remains constant, the laser beam remains in focus on the surface of the part, and the laser beam moves at a constant surface speed along the surface of the part as the part is rotated on the constant speed rotary.

BRIEF DESCRIPTION OF THE DRAWINGS

The features of the present invention will best be understood from a detailed description of the invention and embodiments thereof selected for the purpose of illustration and shown in the accompanying drawings in which.

DETAILED DESCRIPTION OF THE INVENTION

The features of the present invention are illustrated in detail in the accompanying drawings, wherein like reference numerals refer to like elements throughout the drawings. Although the drawings are intended to illustrate the present invention, the drawings are not necessarily drawn to scale.

Figure 1:
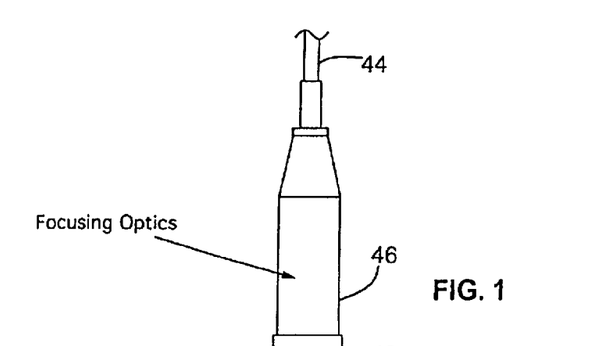
FIG. 1 illustrates a catalytic converter to be welded in accordance with the method and system of the present invention.

FIG. 1 illustrates a catalytic converter 10 to be laser welded in accordance with a method and system of the present invention. The catalytic converter 10 comprises a shell 12 having a first end 14 and a second end 16. A first cone 18 is shown positioned, ready for welding, over the first end 14 of the shell 12. A second cone 20 is configured to be positioned over the second end 16 of the shell 12. The positioning of the second cone 20 over the second end 16 of the shell 12 is indicated by directional arrows 22. Each cone 18, 20, includes an attachment flange 24 that is designed to extend over the ends 14, 16, of the shell 12. The shell 12, first cone 18, and second cone 20, are commonly formed from a material such as stainless steel, and typically have a non-circular (e.g., elliptical) surface contour (as shown by the left-hand-side end view) or are non-concentric (as shown by the right-hand-side end view).

Figure 2:
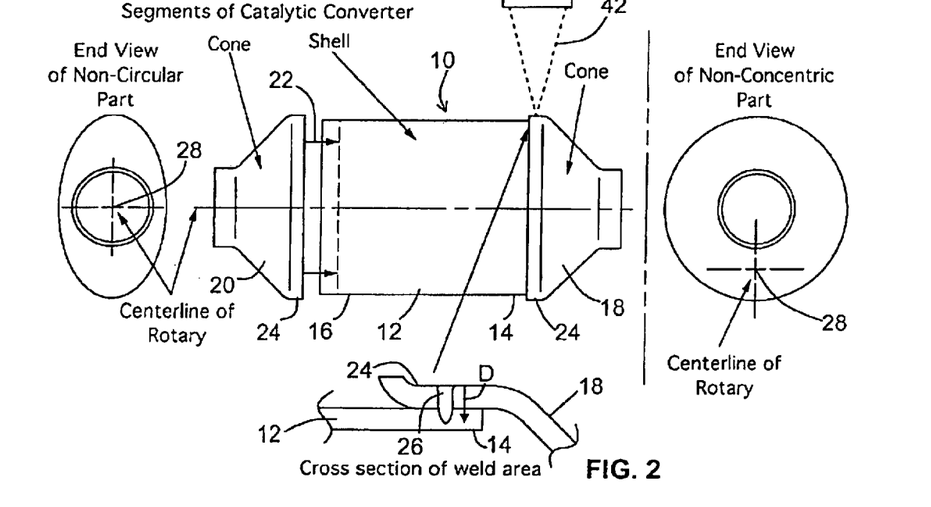
FIG. 2 is a cross-sectional view of a weld between the cone and shell of the catalytic converter shown in FIG. 1, produced in accordance with the present invention.

As shown in cross-section in FIG. 2, the welding process carried out by the present invention is designed to produce a consistent quality weld 26 that extends completely through the flange 24 of each cone 18, 20, and partially into the ends 14, 16, of the shell 12. The penetration depth of the weld 26 is represented by arrow D in FIG. 2. Depending upon the leak tolerances of the catalytic converter 10, the machining tolerances of the shell 12 and cones 18, 20, and/or other factors, a continuous or discontinuous line of welds 26 may be formed about the periphery of the catalytic converter 10. Although a single line of welds 26 is shown, it should be readily apparent that more than one line of welds 26 may be used to weld each of the cones 18, 20 onto the ends 14, 16, of the shell 12.

Figure 8:
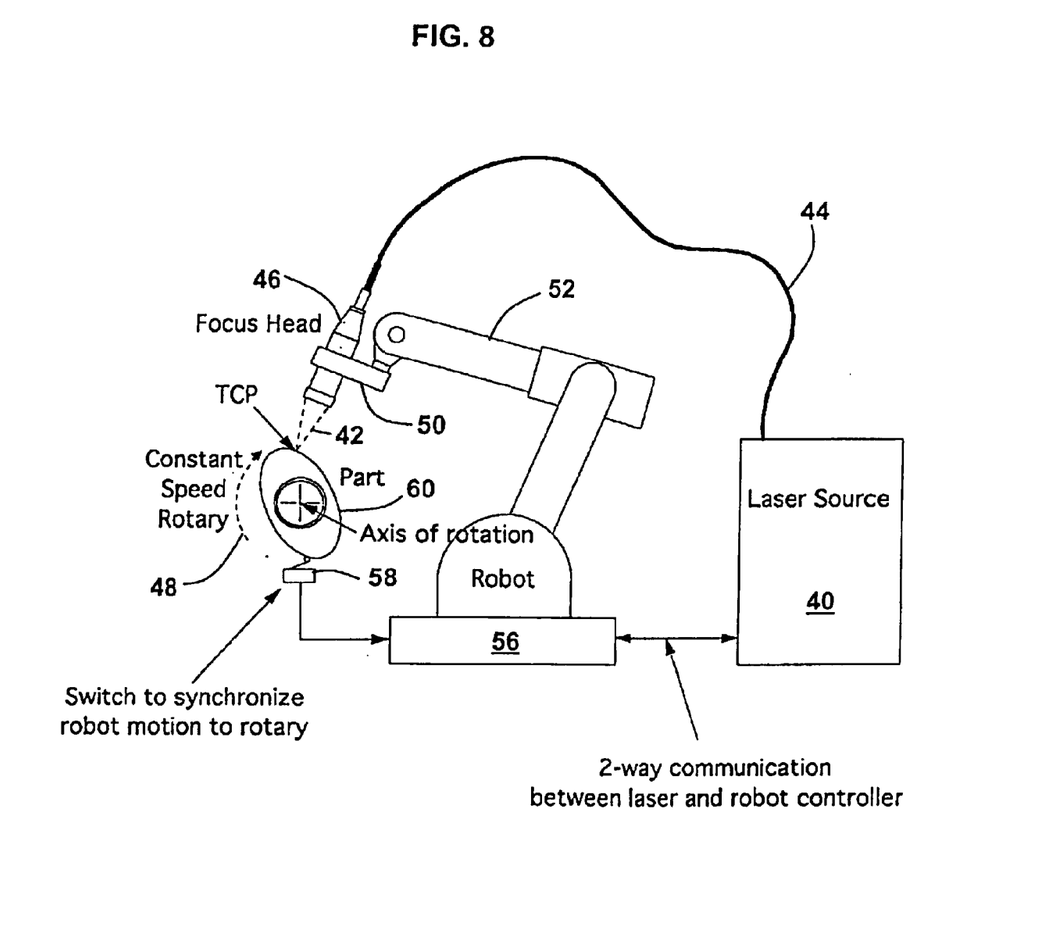
FIG. 8 illustrates a system for carrying out the method steps shown in FIG. 5.

The assembled components of the catalytic converter 10 are welded together using a laser source 40 (see FIG. 8). The laser beam 42 produced by the laser source 40 is coupled by a flexible fiber optic cable 44 to a robotically manipulated focus head 46 containing fiber optic and beam focusing optics. The beam focusing optics direct and focus the laser beam 42 onto the components to be welded. The same focus head 46 may be used to weld both of the first and second cones 18, 20 to the shell 12. Alternately, a pair of focus heads 46 that are operated independently or in parallel, and which are manipulated using the same robotic arm or separate robotic arms, may be used to perform the welding process.

The assembled components of the catalytic converter 10 are mounted on a constant speed rotary (represented by dashed line 48, FIG. 8), and are rotated at a constant speed about an axis corresponding to the centerline 28 of the constant speed rotary 48. The focus head 46 is manipulated by the robotic end effector 50 of a robotic arm 52 (FIG. 8) to control the angle of incidence of the laser beam 42 on the welding surface of the cones 18, 20. In accordance with the present invention, the focus head 46 is manipulated such that the laser beam 42 remains in focus and substantially normal to the welding surface during the rotation of the catalytic converter 10 on the constant-speed rotary 48. Other angles of incidence of the laser beam 42 on the welding surface may be suitable if the quality of the resulting weld is within acceptable tolerances. In addition, the focus head 46 is manipulated such that the laser beam 42 moves at a substantially constant surface speed along the welding surface during the rotation of the catalytic converter on the constant-speed rotary 48, regardless of the contour of the welding surface.

The components of the catalytic converter 10 may be welded together using a continuous wave (CW) laser source operating, for example, in the power range of 1 kW to 4 kW. Alternately, to increase weld penetration, throughput, and yield over that provided by a CW laser source, a modulated laser source may be used. Exemplary modulated laser parameter ranges, using sine- or square-wave modulated waveforms, include 1 kW to 4 kW average laser power, modulation frequencies of 100 Hz to 500 Hz and pulse widths from 1 msec to 10 msec. A peak power density of about 16 kW/mm*2 was produced at the part surface with a lower limit of about 6 kW/mm*2. An example of a suitable laser source 40 that can be used to provide both a CW and modulated laser output is the JK2000 Laser Processing System available from GSI Lumonics.

Figure 3:
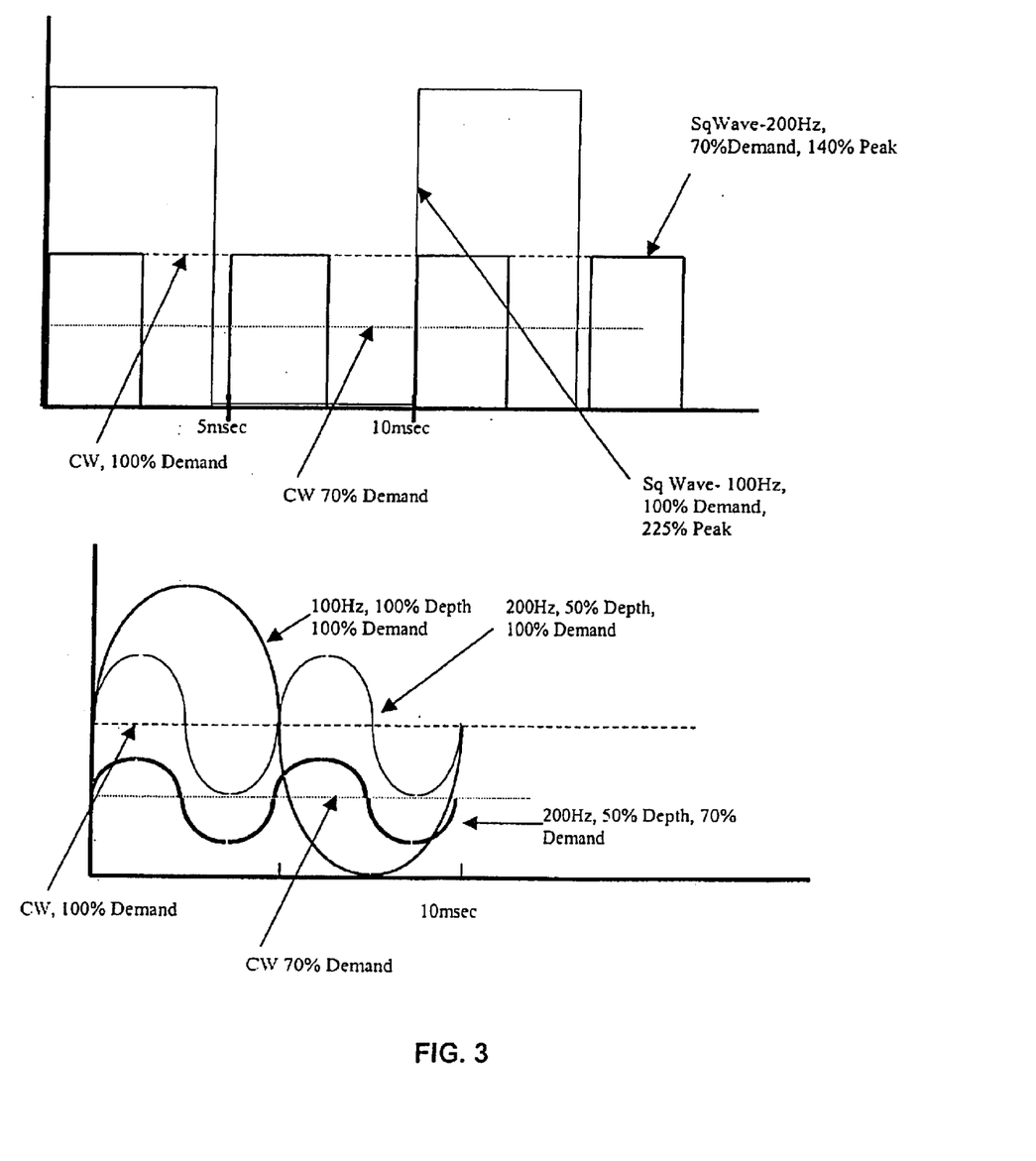
FIG. 3 illustrates exemplary sine-wave and square-wave laser modulation parameters used for welding of the catalytic converter of FIG. 1.
Figure 4:
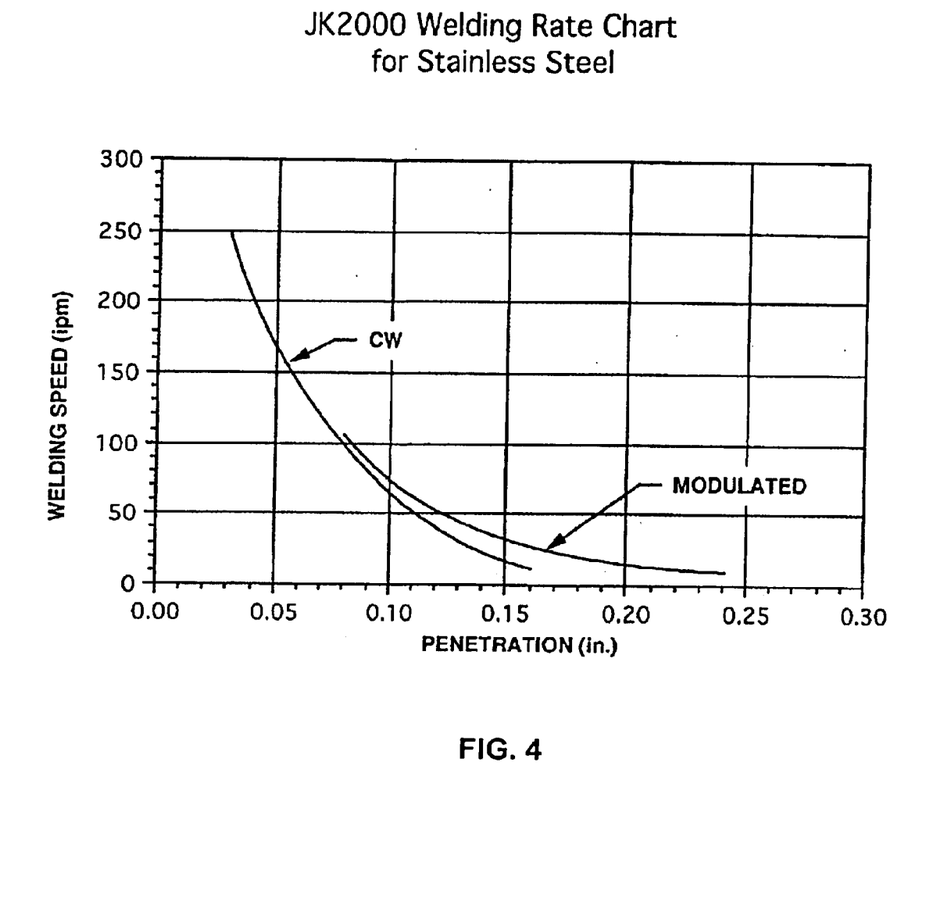
FIG. 4 is a chart showing a relationship between material penetration depth and the speed of laser processing using a commercially available high power laser.

FIG. 3 illustrates the use of square-wave and sine-wave modulation when applied to a catalytic converter welding operation. In this example, a range of about 12–60 J/mm*2 was used, with a range of about 20–28 J/mm*2 for welding of a stainless steel catalytic converter. Of course, the laser parameters will vary depending upon various material properties (e.g., thickness, reflectivity) of the area to be welded. For example, FIG. 4 is a chart showing processing speed as a function of penetration depth for CW and modulated laser sources. The convergence of the curves is explained by limitations associated with pulse energy at higher repetition rates.

In many conventional welding applications, the penetration depth is usually equal to the thickness of the section to be welded. The cross-sectional view of FIG. 2 shows that for the welding of the catalytic converter 10 in accordance with the present invention, partial penetration (as indicated by arrow D) into the surface of the shell 12 is used. Full penetration would damage the material and/or contaminate the weld 26. This leads to a stringent requirement and a narrower process window for producing reliable "LAP" welds when compared to full penetration welding.

Process improvements were observed when laser modulation was used. Table 1 below illustrates specific improvements using modulated vs. continuous wave laser processing for the catalytic converter application. In production operations the cycle time improvements are significant.

TABLE 1

| Laser Settings | Penetration | Speed | Cycle Time | Working Range |
| --- | --- | --- | --- | --- |
| 1700 watts Continuous wave | 2.2 mm | 1.5 m/min | 20 sec | +/− 1.0 mm |
| 1700 watts Sine wave modulation | 2.2 mm | 1.7 m/min | 17.6 sec | +/− 1.25 mm |
| 1700 watts Square wave modulation | 2.2 mm | 1.9 m/min | 15.8 sec | +/− 1.5 mm |

The high instantaneous power associated with square wave modulation reduces the reflectivity of the material (stainless steel in the present example) and increases coupling of the energy into the target material. The non-linear absorption reduces the required cycle time for a specified level of penetration.

Table 1 illustrates results obtained with sine- and square-wave modulation of a lamp, which is the pump source for the welding laser used. Various other wave-shapes may also be used, including ramp or triangular pulses. Likewise, high power diode pumped lasers may be used in future welding systems.

The increased working range (e.g., depth of focus at which power and spot size are sufficient for processing without adjusting focus) at each surface point provided by a modulated laser source increases the speed of operation since extra processing time for focusing operations is avoided. The power density in the region of the beam waist and beam quality is sufficiently high to provide for reliable welding operation over an increased range.

The use of a modulated laser output often results in process improvements for many applications, such as the welding of a stainless steel catalytic converter. However, for other applications, the high peak-power densities of a modulated laser output may cause boiling or vaporizing of the material resulting in excess process spatter and weld porosity. In such cases, CW lasers may be used for the welding process.

A "top hat" spatial profile having relatively uniform energy was used in the welding of the exemplary catalytic converter system. This spatial profile resulted from transmission of the laser beam through an optical fiber system, as described above. It is to be understood, however, that other suitable spot distributions may also be used.

In accordance with the present invention, the parts to be welded (e.g., cones 18, 20) have a smoothly varying surface, either in a localized region for welding or over the entire part. The parts may be manufactured or machined to within a pre-determined tolerance, for instance a +/−1 mm specified variation of a catalytic converter surface. In one configuration the tolerance at each surface point will be within a working depth range over which the energy or power density of the laser beam and the spatial spot shape provide for reliable operation. The use of real time focusing and feedback is not required, or is at least minimized.

A programming method was developed to provide nearly constant relative surface speed of the focused laser beam on a part 60 (e.g., catalytic converter 10) as it rotates on a constant speed rotary, even though the outer surface of part is not circular but may be elliptical, or of another smoothly varying shape.

Figure 5:
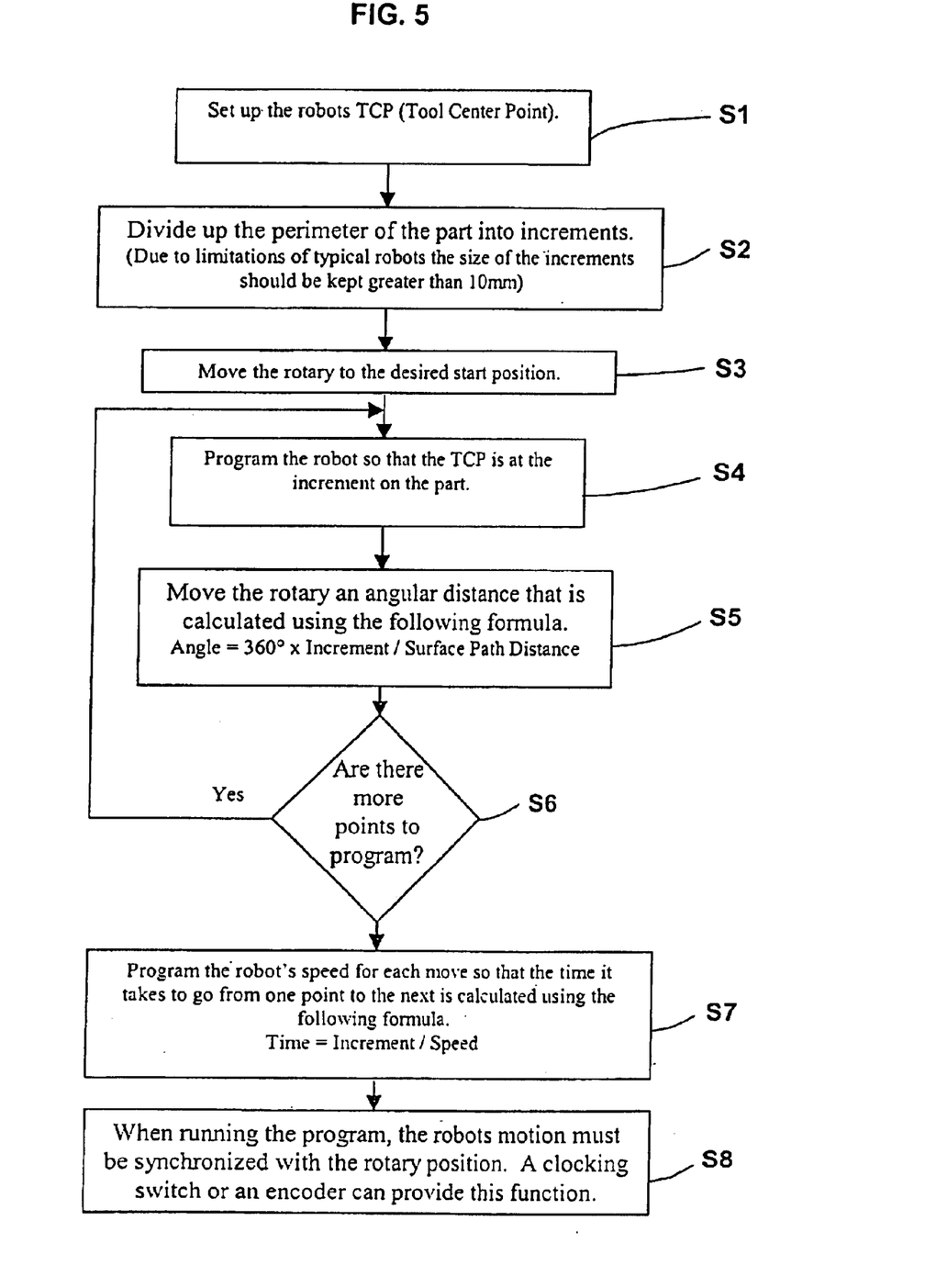
FIG. 5 is a flow chart illustrating a method of robot programming used to control the robotic laser welding of non-circular parts, non-concentric parts, or other parts having smoothly varying surface slopes/contours in a region to be welded.
Figure 6:
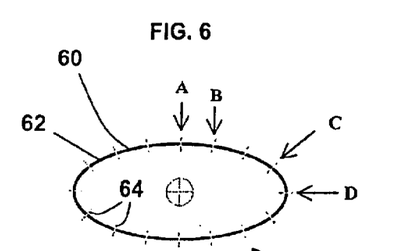
FIG. 6 illustrates a non-circular (e.g., elliptical) part divided into sixteen equal length segments in accordance with step S2 of FIG. 5.

A flow chart illustrating a robot programming method in accordance with the present invention is shown in FIG. 5. A corresponding robotic system for carrying out the method is shown in FIG. 8. In step S1, the "tool center point" (TCP) of the robot 56 is established. The TCP refers to the three-dimensional focal position of the output laser beam 42 produced by the focus head 46, which is manipulated by the robotic end effector 50 of a robotic arm 52. In step S2, the surface distance of the welding path around the part to be welded is determined. The surface distance is segmented into a plurality of increments having equal surface distances. As shown in FIG. 6, for example, the welding path around a non-circular part 60, such as cone 18 or 20 of the catalytic converter 10, has been divided into sixteen increments 62 having equal surface distances. In particular, in FIG. 6, the surface distance between points A and B is the same as that from C to D and for all other increments. Programming points 64 on the path, corresponding to the plurality of increments 62 and each separated by an equal surface distance, are marked on the part 60 with a measuring tape or other means. Alternatively, a computer based model or representation of the part may be utilized. Likewise, the surface may be measured or characterized with a coordinate measurement device, for instance a touch probe or 3D vision system.

The surface path distance increment is also used to determine an angular displacement of the constant speed rotary 48. For example, if the surface path distance is 400 mm and the incremental distance is 25 mm, then the angular displacement is 22.5 degrees since there are 16 points spaced apart along the surface and 360/16 is 22.5 degrees.

Figure 7A:
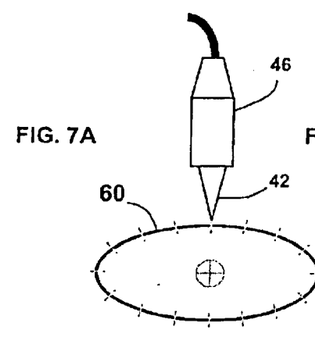
FIGS. 7A–7F illustrate an iterative process for generating a robotic path program wherein equidistant surface segments are defined corresponding to incremental angular positions, in accordance with the method steps shown in FIG. 5.
Figure 7B:
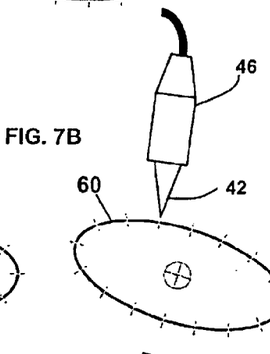
Figure 7C:
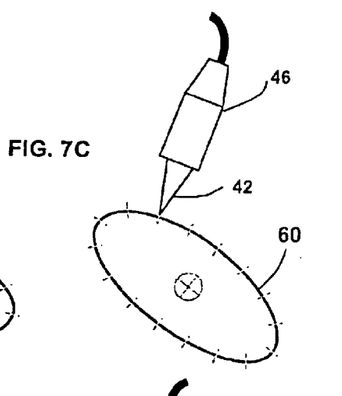
Figure 7D:
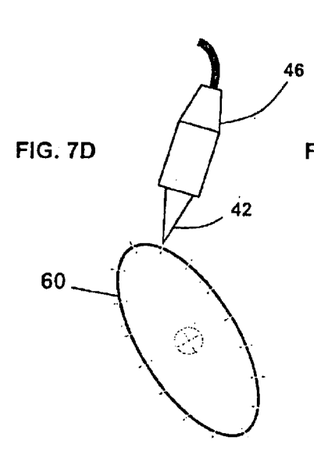
Figure 7E:
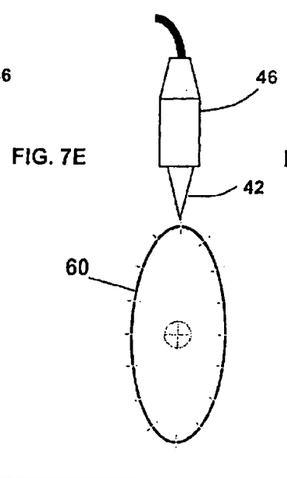
Figure 7F:
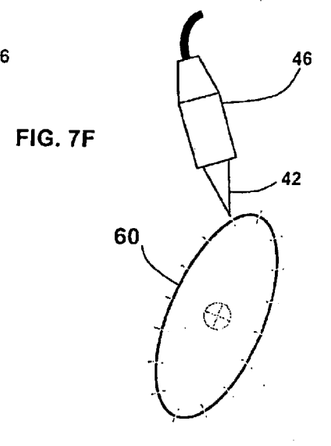

In step S3, the part 60 is positioned at a reference angular start point through rotation of the constant speed rotary 48. In this example, as shown in FIG. 7A, the reference angular start point is zero degrees. In step S4, the focus head 46 is manipulated by the robotic end effector 50 of the robotic arm 52 to bring the laser beam 48 into focus at the correct angle (e.g., normal) to the surface of the part 60 at the start point. This first point is entered into the robotic path program. In step S5, as shown in FIG. 7B, the constant speed rotary 48 is rotated (clockwise in this example) by the incremental angular distance (in our example 22.5 degrees) and then the focus head 46 is repositioned above the second point mark 64 on the part 60 at the correct focus position and angle to the surface. This second point is entered into the robotic path program in step S4. This process is continued (step S6) for all the marked points 64, and may include some overlap of the same points after the start point to allow for complete processing and a possible weld ramp-down. FIGS. 7C–7F illustrate the above process for the next four programming points 64.

In step S7, instructions are added to the above-described robot path program to move from one program point to the next over a constant time base, and not with a programmed speed as is normal with robotic programming. Specifically, the robot's speed for each move is programmed such that the time it takes to go from one program point to the next is calculated using the formula: Time=Increment/Speed. Using the process illustrated in the flow chart of FIG. 5, the present invention provides a nearly constant surface speed of the focused laser beam 42 on the part 60 as it rotates on the constant speed rotary 48, thereby providing consistent, efficient, high quality welds around the part, even for non-circular or non-concentric parts.

A start signal or clock signal from the constant speed rotary 48 carrying the part 60 is used to synchronize (step S8) the start of the rotary motion, at a known start position on the surface of the part 60, to the start of the robot arm 52 motion in the program. The constant speed rotary 48 carrying the part 60 uses a fixturing technique so that the clock signal relates to a known part orientation. Coordinated motion between the constant speed rotary 48 and the robotic arm 52 is not required. This method produces constant surface speed (or nearly constant speed) between an uncoordinated rotary axis and a robot 56; the constant speed rotary 48 only needs to be synchronized with the motion of the robot 56. As shown in FIG. 8, the robot 56 can be synchronized with the constant speed rotary 48 using a switch 58 or by using a servo-controlled axis with an encoder feedback to the robot 56.

The above-described method is relatively inexpensive to implement, flexible in terms of being able to process different types/shapes of parts 60, keeps the focus head 46 normal to the surface, and accurately keeps the surface speed constant. This allows better, lighter, and more durable welds to be produced at higher speed and efficiency, and with greater economy of operation.

It is to be understood that various alternative programming methods and control algorithms can be used for precision robotic laser welding of parts, including non-circular or non-concentric parts fixtured onto and positioned by a rotary axis. Several exemplary control methods are described below with reference to FIGS. 9–11. Other coordinate descriptions and reference frames can also be used to determine position and velocity when practicing the present invention.

Figure 9:
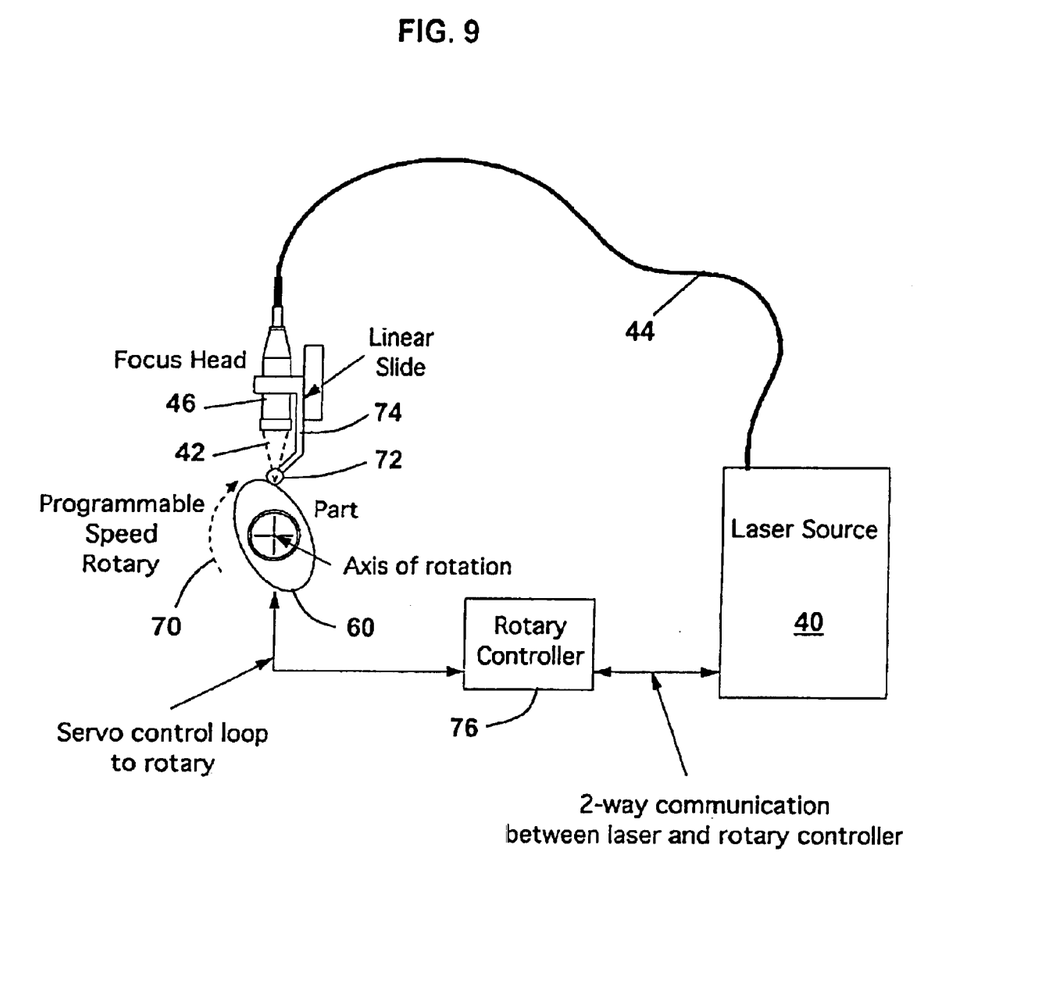
FIG. 9 illustrates an alternate embodiment of a focus head positioning system that does not require a robot. This embodiment provides restricted control of a focus head relative to the surface to be welded.

The embodiment of the present invention illustrated in FIG. 9 uses a variable speed rotary 70 with cam or wheel 72 mounted on a linear slide 74 to keep the TCP (Tool Center Point) on the surface of the part 60. The speed of the variable speed rotary 70 is adjusted by a rotary controller 76 in relation to the distance between the TCP and the center of the rotary 70 to keep the surface speed (the speed of the TCP in relation to the surface of the part 60) constant. No robot is necessary for this method however the focus head 46 may not stay normal to the surface.

Figure 10:
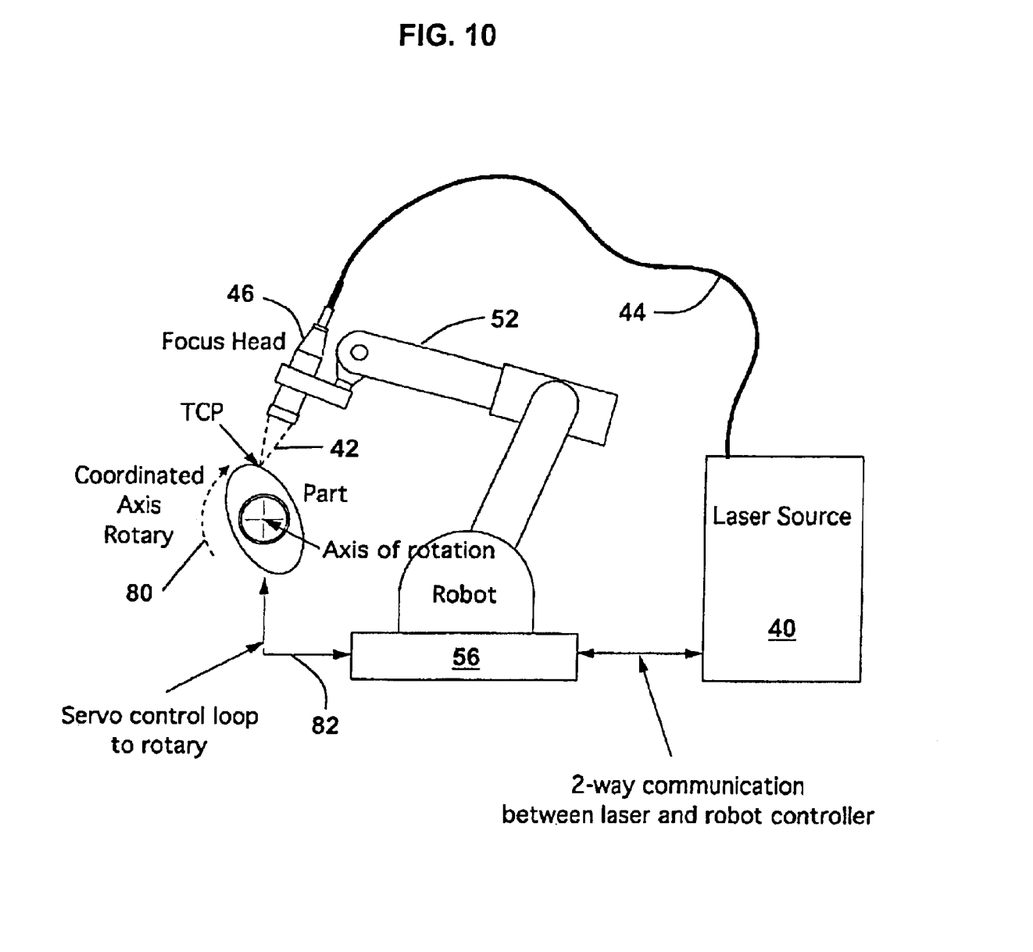
FIG. 10 shows a further embodiment of a focus head positioning system wherein a coordinated robotic axis is used with simplified programming.

The embodiment of the present invention illustrated in FIG. 10 uses a robot 56 and a coordinated axis rotary 80 (the rotary axis is controlled and monitored by the robot 56 via a servo control loop 82). For additional details on exemplary coordinated robotic systems, see U.S. Pat. No. 5,428,280, which is incorporated herein by reference. In the configuration of FIG. 10, the center of the coordinated axis rotary 80 is programmed in relation to the TCP. When programming for this configuration, the surface speed is kept constant by simply programming the desired speed into the robot's commands. The robot 56 uses its algorithms to keep the surface speed at the specified rate by adjusting the rotary speed and/or the TCP speed. Although this method is relatively simple in terms of programming, the addition of a coordinated axis to the robot 56 can be expensive.

Figure 11:
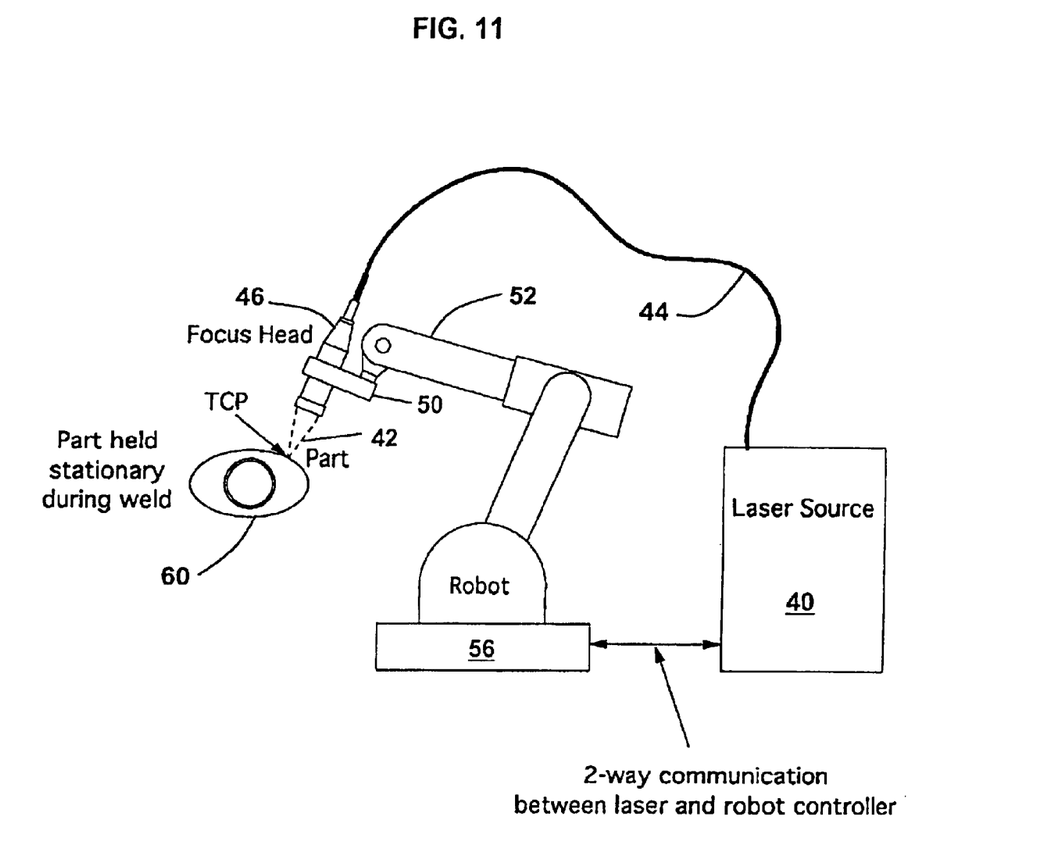
FIG. 11 illustrates another embodiment of a focus head positioning system wherein the part to be welded is held stationary while the focus head is robotically manipulated. This embodiment requires that part be flipped over during the welding process.

Another embodiment is illustrated in FIG. 11. This method may be used, for example, for welding catalytic converter segments in a non-production, off-line, or low volume environment. In this configuration, the part 60 is held stationary while the robot 56 manipulates the focus head 46 in a conventional manner to keep the surface speed constant. This method is simple to set up because a rotary is not involved. However, extra time is required with this method because the part 60 must be flipped over (e.g., in a manual operation) to allow the robot 56 to access the opposite side of the part for welding. As such, this approach may have only limited use in high-speed production operations, but is expected to be generally applicable in low volume applications or for experimental purposes.

Other programming/control embodiments, which in turn may be combinations of the above, may also be used for the welding of parts having surface contours that are within a pre-determined or specified dimension.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention. For example, a similar application may require an adjustment of the laser parameters to control the penetration depth or weld shape for different materials. Different material thickness or reflectivity may lead to an energy pulse width range that is offset relative to that described above for use in the welding of stainless steel catalytic converter parts. Furthermore, the invention may be practiced using the surface measurements at discrete points and then utilizing an existing coordinate robot. Likewise, the programming method of the present invention may also be applicable in other processing environments wherein economy and efficiency are appreciated, for instance welding of bio-medical assemblies such as a pacemaker or other toleranced parts.

It is understood that the systems, functions, mechanisms, and methods described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

What is claimed is:

1. A method of laser welding comprising:

providing a part having sections to be welded together;

rotating the part on a constant speed rotary;

generating a laser beam;

directing the laser beam onto a surface of the part to weld the sections of the part together; and controlling the laser beam such that an angle of incidence of the laser beam on the surface of the part remains constant, the laser beam remains in focus on the surface of the part, and the laser beam moves at a constant surface speed along the surface of the part as the part is rotated on the constant speed rotary;

wherein the controlling step is provided by manipulating a focus head outputting the laser beam using a robot, and wherein a programming method is used to program the robot, the programming method comprising:

determining a surface distance around the part;

segmenting the surface distance of the part into a plurality of increments having equal surface distances;

determining an incremental angular displacement of the constant speed rotary based on the surface distance of the part and the number of increments;

positioning the part at a reference angular start point corresponding to a selected programming point;

manipulating the focus head to brine the laser beam into focus at the anile of incidence on the surface of the part at the selected programming point, and storing positional information for the focus head in a path program for the robot;

rotating the part by the incremental annular displacement to the next programming point; and repeating the manipulation and rotating steps for each successive programming point.

2. The method of claim 1, wherein the part is non-circular.

3. The method of claim 2, wherein the non-circular part is a catalytic converter.

4. The method of claim 1, wherein the part includes an outer section and an inner section, and wherein a weld produced by the laser beam penetrates the outer section and a portion of the inner section.

5. The method of claim 1, wherein the sections of the part are welded about a circumference of the part.

6. The method of claim 1, wherein the angle of incidence of the laser beam on the surface of the part is maintained substantially normal to the surface.

7. A method for programming a laser welding robot, comprising:

determining a surface distance around a part to be welded, wherein the part is rotated on a constant speed rotary;

segmenting the surface distance of the part into a plurality of increments having equal surface distances;

determining an incremental angular displacement of the constant speed rotary based on the surface distance of the part and the number of increments;

positioning the part at a reference angular start point corresponding to a selected programming point;

manipulating a focus head of the robot to bring a laser beam into focus at the angle of incidence on the surface of the part at the selected programming point, and storing positional information for the focus head in a path program for the robot;

rotating the part by the incremental angular displacement to the next programming point; and repeating the manipulation and rotating steps for each successive programming point.

8. The method of claim 7, wherein the part is non-circular.

9. The method of claim 8, wherein non-circular part is a catalytic converter.

10. The method of claim 7, wherein the part includes an outer section and an inner section, and wherein a weld produced by the laser beam penetrates the outer section and a portion of the inner section.

11. The method of claim 7, wherein the sections of the part are welded about a circumference of the part.

12. The method of claim 7, wherein the angle of incidence of the laser beam on the surface of the part is maintained substantially normal to the surface.

* * * * *